United States Patent
Wang et al.

(10) Patent No.: US 12,382,162 B2
(45) Date of Patent: Aug. 5, 2025

(54) PHOTOGRAPHING METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Junqiang Wang, Beijing (CN); Daoyu Wang, Beijing (CN); Hui Sun, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 170 days.

(21) Appl. No.: 18/547,089

(22) PCT Filed: Feb. 18, 2022

(86) PCT No.: PCT/CN2022/076784
§ 371 (c)(1),
(2) Date: Aug. 18, 2023

(87) PCT Pub. No.: WO2022/174806
PCT Pub. Date: Aug. 25, 2022

(65) Prior Publication Data
US 2024/0129623 A1   Apr. 18, 2024

(30) Foreign Application Priority Data
Feb. 20, 2021  (CN) .......................... 202110194266.4

(51) Int. Cl.
*H04N 23/63* (2023.01)
*H04N 23/60* (2023.01)
*H04N 23/67* (2023.01)

(52) U.S. Cl.
CPC ........... *H04N 23/632* (2023.01); *H04N 23/64* (2023.01); *H04N 23/675* (2023.01)

(58) Field of Classification Search
CPC .... H04N 23/632; H04N 23/62; H04N 23/675; H04N 23/64; G06F 3/048
(Continued)

(56) References Cited

U.S. PATENT DOCUMENTS

| 9,602,732 B2* | 3/2017 | Mäkinen | ............. H04R 5/027 |
| 10,043,236 B2* | 8/2018 | Sato | ............. G06F 3/04845 |

(Continued)

FOREIGN PATENT DOCUMENTS

| CN | 304737293 S | 7/2018 |
| CN | 110688525 A | 1/2020 |

(Continued)

OTHER PUBLICATIONS

Supplemental Search Report issued in Chinese Patent Application No. 202110194266.4, Dec. 25, 2023, with English translation (4 pages).
(Continued)

*Primary Examiner* — Pritham D Prabhakher
(74) *Attorney, Agent, or Firm* — Fish & Richardson P.C.

(57) ABSTRACT

Provided are a shooting method and apparatus, an electronic device, and a storage medium. The shooting method includes: receiving a prop display operation acting on a shooting page; in response to the prop display operation, displaying a first prop control area and a second prop control area on two sides of the main shooting control separately; when a target slide operation acting on the shooting page is received, controlling multiple shooting controls to move along a sliding direction of the target slide operation, and when the target slide operation ends, using a shooting control located at the trigger position as a target shooting control; and if the target shooting control is a prop control, displaying the preview effect corresponding to the target shooting control in the shooting page, and when a first
(Continued)

trigger operation acting on the trigger position is detected, performing shooting by using the target shooting control.

17 Claims, 8 Drawing Sheets

(58) Field of Classification Search
USPC .................................................... 348/333.02
See application file for complete search history.

(56) References Cited

U.S. PATENT DOCUMENTS

| | | | | |
|---|---|---|---|---|
| 10,088,989 | B2* | 10/2018 | Rivard | G06F 3/04883 |
| 10,645,272 | B2* | 5/2020 | Srivastava | H04N 23/63 |
| 11,039,074 | B1* | 6/2021 | Manzari | G06F 3/04847 |
| 2012/0268641 | A1* | 10/2012 | Kazama | H04N 23/45 |
| | | | | 348/E5.051 |
| 2013/0235071 | A1* | 9/2013 | Ubillos | G06T 11/60 |
| | | | | 345/581 |
| 2015/0326793 | A1* | 11/2015 | Mäkinen | H04N 23/69 |
| | | | | 348/240.99 |
| 2015/0339801 | A1* | 11/2015 | Sato | G06F 3/04845 |
| | | | | 345/648 |
| 2016/0139774 | A1* | 5/2016 | Rivard | H04N 23/74 |
| | | | | 715/781 |
| 2017/0013179 | A1* | 1/2017 | Kang | H04N 23/631 |
| 2018/0107360 | A1* | 4/2018 | Kim | G06F 3/04817 |
| 2019/0174054 | A1* | 6/2019 | Srivastava | H04N 23/63 |
| 2019/0174055 | A1* | 6/2019 | Srivastava | H04N 23/62 |
| 2020/0358963 | A1* | 11/2020 | Manzari | H04N 23/633 |

FOREIGN PATENT DOCUMENTS

| | | |
|---|---|---|
| CN | 111246102 A | 6/2020 |
| CN | 112019422 A | 12/2020 |
| CN | 112135059 A | 12/2020 |
| CN | 112153283 A | 12/2020 |
| JP | 2010028250 A | 2/2010 |
| WO | 2020/248985 A1 | 12/2020 |

OTHER PUBLICATIONS

International Search Report and Written Opinion, International Patent Application No. PCT/CN2022/076784, Apr. 24, 2022, with English translation of the Search Report (8 pages).

Mobile phone scrap film into large B612 filter tutorial, author—Xiang Ling Gu Se, release date Apr. 6, 2018 with machine translation, https://www.xiahongs20180406hu.com/discovery/item/5ac75ab0a7c9b87afb38076 (8 pages).

Office Action issued in 202110194266.4, Dec. 15, 2022, with machine translation (11 pages).

Office Action issued in 202110194266.4, Jun. 25, 2023, with machine translation (9 pages).

* cited by examiner

PHOTOGRAPHING METHOD AND APPARATUS, ELECTRONIC DEVICE, AND STORAGE MEDIUM

CROSS-REFERENCE TO RELATED APPLICATIONS

This is a National Stage Application filed under 35 U.S.C. 371 based on International Patent Application No. PCT/CN2022/076784, filed on Feb. 18, 2022, which claims priority to Chinese Patent Application No. 202110194266.4 filed on Feb. 20, 2021, disclosures of both of which are incorporated herein by reference in their entireties.

TECHNICAL FIELD

The present disclosure relates to the field of computer technology, for example, a shooting method and apparatus, an electronic device, and a storage medium.

BACKGROUND

A user may use props provided by application software for performing shooting. For example, a prop panel is displayed in a shooting page, and the user views the shooting effect of a prop by clicking on the prop in the prop panel and performs the shooting.

The prop panel is generally a list panel or a lateral slide panel shown in the shooting page by default. However, when the props are shown in the manner of the list panel, the user cannot view the overall preview effect of the prop in real time after clicking on the prop, and prop screening efficiency is relatively low, and when the props are shown in the manner of the lateral slide panel, other function controls in the shooting page cannot be exposed normally, which affects normal use of other functions and results in poor shooting experience of the user.

SUMMARY

The present disclosure provides a shooting method and apparatus, an electronic device, and a storage medium to improve the screening efficiency of props without affecting normal use of other functions.

The present disclosure provides a shooting method. The shooting method includes the steps described below.

A prop display operation acting on a shooting page is received, where a trigger position is preset in the shooting page, and a main shooting control is displayed at the trigger position.

In response to the prop display operation, a first prop control area and a second prop control area are displayed on two sides of the main shooting control separately, where the first prop control area is used for displaying a first prop control which is collected and the second prop control area is used for displaying a second prop control which is recommended.

In response to the reception of a target slide operation acting on the shooting page, multiple shooting controls are controlled to move along a sliding direction of the target slide operation, and in response to the end of the target slide operation, a shooting control located at the trigger position is used as a target shooting control, where the multiple shooting controls include the main shooting control and multiple prop controls, and the multiple prop controls include the first prop control collected in the first prop control area and the second prop control recommended and displayed in the second prop control area.

If the target shooting control is a prop control, the preview effect corresponding to the target shooting control is displayed in the shooting page, and in response to the detection of a first trigger operation acting on the trigger position, shooting is performed by using the target shooting control.

The present disclosure further provides a shooting apparatus. The shooting apparatus includes an operation reception module, an area display module, a control determination module, and a shooting module.

The operation reception module is configured to receive a prop display operation acting on a shooting page, where a trigger position is preset in the shooting page, and a main shooting control is displayed at the trigger position.

The area display module is configured to, in response to the prop display operation, display a first prop control area and a second prop control area on two sides of the main shooting control separately, where the first prop control area is used for displaying a first prop control which is collected and the second prop control area is used for displaying a second prop control which is recommended.

The control determination module is configured to, in response to the reception of a target slide operation acting on the shooting page, control multiple shooting controls to move along a sliding direction of the target slide operation, and in response to the end of the target slide operation, use a shooting control located at the trigger position as a target shooting control, where the multiple shooting controls include the main shooting control and multiple prop controls, and the multiple prop controls include the first prop control collected in the first prop control area and the second prop control recommended and displayed in the second prop control area.

The shooting module is configured to, in response to the target shooting control being a prop control, display the preview effect corresponding to the target shooting control in the shooting page, and in response to the detection of a first trigger operation acting on the trigger position, perform shooting by using the target shooting control.

The present disclosure further provides an electronic device.

The electronic device includes one or more processors and a memory.

The memory is configured to store one or more programs.

When the one or more programs are executed by the one or more processors, the one or more processors perform the preceding shooting method.

The present disclosure further provides a computer-readable storage medium. The storage medium stores a computer program which, when executed by a processor, causes the processor to perform the preceding shooting method.

DETAILED DESCRIPTION

Embodiments of the present disclosure are described hereinafter with reference to the drawings.

The drawings illustrate some embodiments of the present disclosure, but the present disclosure may be implemented in various manners and should not be construed as limited to the embodiments set forth herein. These embodiments are provided for more thorough and complete understanding of the present disclosure. The drawings and embodiments of the present disclosure are illustrative.

Steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

Concepts such as "first" and "second" in the present disclosure are used to distinguish between apparatuses, between modules, or between units and are not intended to limit the order or mutual dependence of the functions performed by these apparatuses, modules, or units.

"One" and "multiple" mentioned in the present disclosure are not limiting but illustrative and should be construed as "one or more" by those skilled in the art, unless otherwise specified in the context.

Names of messages or information exchanged between apparatuses in the embodiments of the present disclosure are only used for illustrative purposes, and are not intended to limit the scope of the messages or information.

Figure 1:
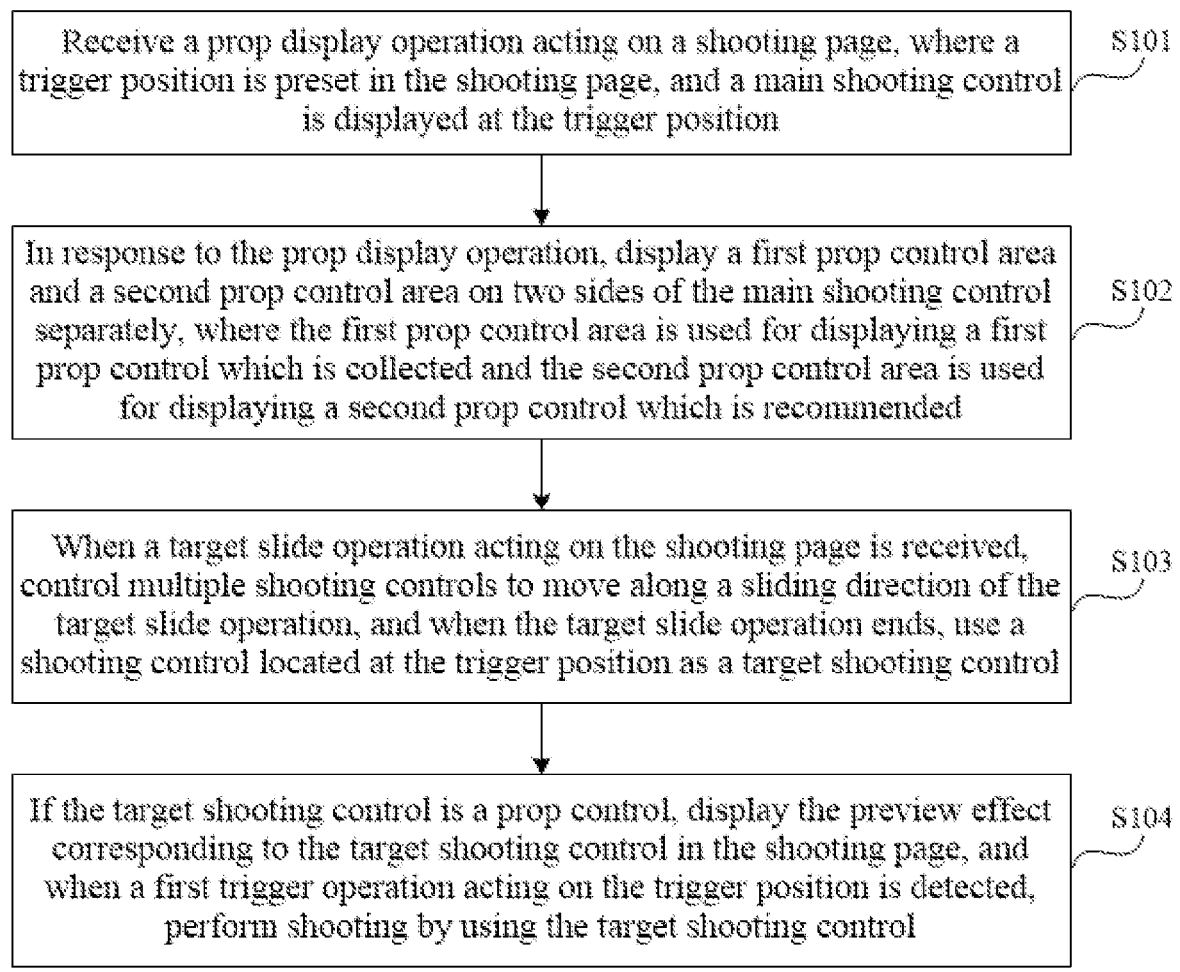
FIG. 1 is a flowchart of a shooting method according to an embodiment of the present disclosure.

FIG. 1 is a flowchart of a shooting method according to an embodiment of the present disclosure. The method may be performed by a shooting apparatus. The apparatus may be implemented by software and/or hardware and may be configured in an electronic device such as a mobile phone or a tablet computer. The shooting method provided in the embodiment of the present disclosure is applicable to the scenario where the preview effect of a shooting prop is viewed and shooting is performed. As shown in FIG. 1, the shooting method provided in this embodiment may include the steps described below.

In S101, a prop display operation acting on a shooting page is received, where a trigger position is preset in the shooting page, and a main shooting control is displayed at the trigger position.

The prop display operation may be a trigger operation for instructing the electronic device to display the prop control of the shooting prop, such as a trigger operation for clicking a prop display control displayed in the shooting page, or an operation for performing a shooting adjustment, such as the operation (that is, a focus operation) of a user to control a camera to focus. The trigger position is an area which is in the shooting page and used for displaying the preview effect of a corresponding prop through an automatic trigger. The trigger position may be an area located on the left side, right side, or middle of the shooting page, for example, a circular area located on the lower portion of the shooting page and having a center on a perpendicular bisector of the shooting page in a vertical direction. The main shooting control may be understood as a control for performing the shooting in a mode with no shooting special effect. That is, when it is detected that the main shooting control is located at the trigger position of a control area or when it is detected that the user triggers the main shooting control, the electronic device does not add the prop effect of any shooting prop to the shooting page.

Figure 2:
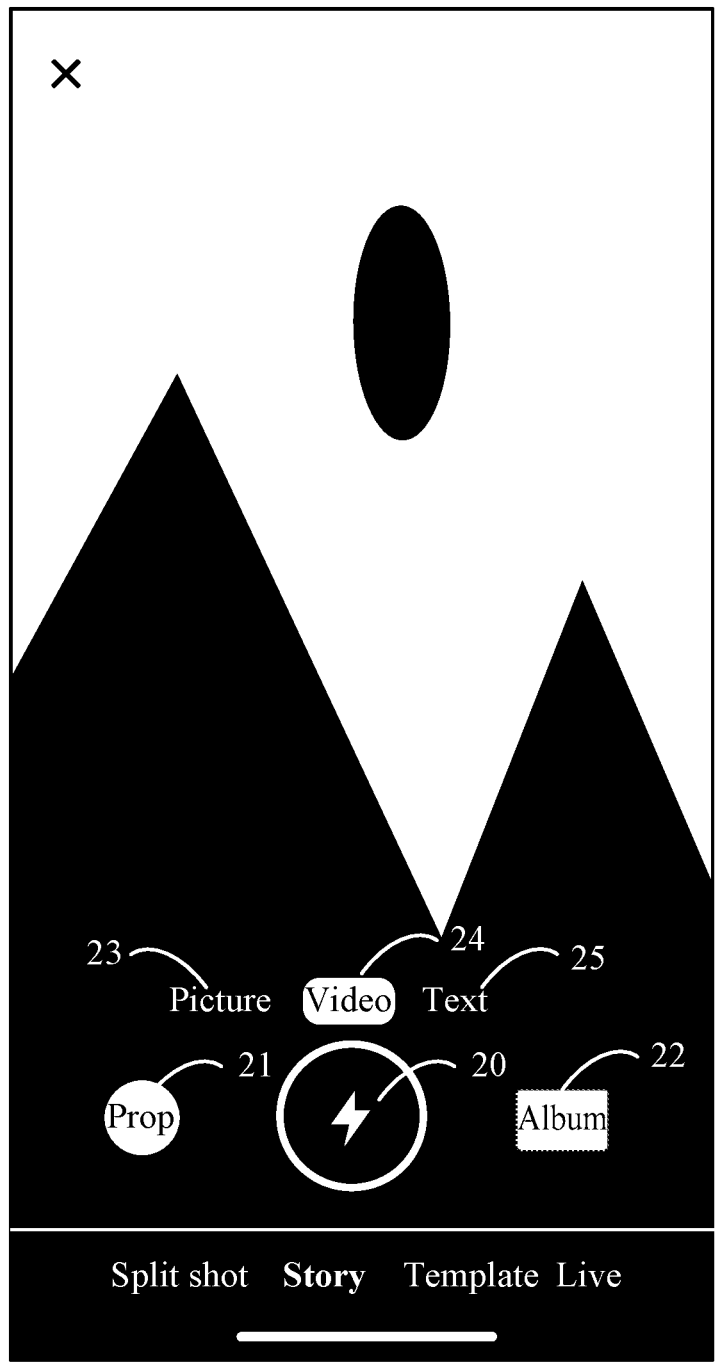
FIG. 2 is a schematic diagram of a shooting page according to an embodiment of the present disclosure.

For example, as shown in FIG. 2, a main shooting control 20 and a prop display control 21 may be provided in the shooting page, where the main shooting control 20 may be displayed at the trigger position, and the prop display control 21 may be displayed on a side of the main shooting control, and an album control 22 may also be provided in the shooting page so that the user instructs, by triggering the album control 22, the electronic device to display the user's local album. In addition, a picture control 23, a video control 24, and a text control 25 may also be provided in the shooting page. Thus, the user may select the type of content to be shot by switching the picture control 23/the video control 24 to a selected state. That is, the user may switch the picture control 23 to the selected state by clicking the picture control 23 to give the instruction to the electronic device that the type of the content to be shot is a picture and may switch the video control 24 to the selected state by clicking the video control 24 to give the instruction to the electronic device that the type of the content to be shot is a video. Alternatively, the text control 25 is triggered such that text is added to the shooting page.

The electronic device displays the shooting page, displays the main shooting control at the trigger position of the shooting page, and displays the prop display control in the shooting page. Thus, when the user wants to add a prop to the shooting page; the user may trigger the prop display control. Accordingly, when detecting that the user triggers the prop display control, the electronic device determines that the prop display operation is received. Alternatively, when the user wants to control the camera to focus, the user may perform the focus operation. For example, the user clicks on the position of the image of a scene on which the user wants to control the camera to focus, where the position is in the shooting page. Accordingly, when detecting that the user performs the focus operation, the electronic device may determine that the user is about to perform the shooting and may have the need to add the prop to the shooting page, and it is determined that the prop display operation is received.

In S102, in response to the prop display operation, a first prop control area and a second prop control area are displayed on two sides of the main shooting control separately, where the first prop control area is used for displaying a first prop control which is collected and the second prop control area is used for displaying a second prop control which is recommended.

The first prop controls may be prop controls collected by the user, that is, the prop controls of shooting props (that is, collected shooting props) collected by the user. The second prop controls may be recommended prop controls such as the prop controls of shooting props (that is, recommended shooting props) recommended for the user according to the information about the user (such as the gender and/or age of the user), usage habits of the user, and/or the popularity of different props. One or more first prop controls and one or more second prop controls may be provided. The number of first prop controls and the number of second prop controls may be determined based on the number of shooting props of corresponding types matched with the user and a preset number threshold. For example, when the number of collected shooting props/recommended shooting props matched with the user is greater than or equal to the preset number threshold, the number of first prop controls/second prop controls which may be acquired is the preset number threshold, and when the number of collected shooting props/recommended shooting props matched with the user is less than the preset number threshold, all first prop controls/second prop controls matched with the user may be acquired. The preset number threshold may be set according to requirements, for example, the preset number threshold may be set to 10, 20, or the like. The first prop control area and the second prop control area may be two areas in the shooting page which are used for displaying prop controls and located on two sides of the main shooting control separately. For example, the first prop control area and the second prop control area may be two areas located on two opposite sides of the main shooting control. For example, the first prop control area and the second prop control area may be located on the left side and the right side of the main shooting control, respectively, or the first prop control area and the second prop control area may be located on the upper side and the lower side of the main shooting control, respectively. Accordingly, the first prop controls, the main shooting control, and the second prop controls may be arranged in a lateral queue or a longitudinal queue. The description is performed below with the example in which the first prop controls, the main shooting control, and the second prop controls are arranged in the lateral queue. The first prop control area may be used for displaying the first prop controls and the second prop control area may be used for displaying the second prop controls.

Figure 3:
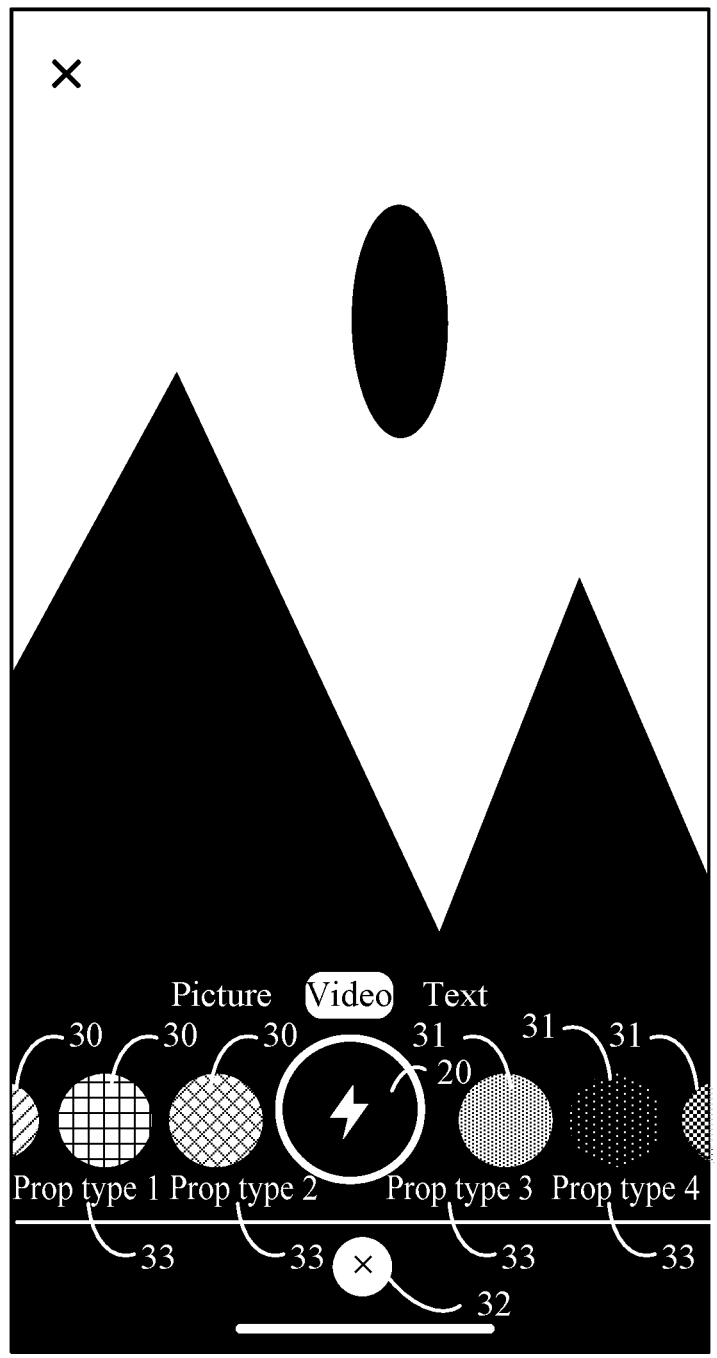
FIG. 3 is a schematic diagram of another shooting page according to an embodiment of the present disclosure.

As shown in FIG. 3 (the figure shows the example in which first prop controls 30 are displayed on the left side of the main shooting control 20 and second prop controls 31 are displayed on the right side of the main shooting control 20), when the electronic device receives the prop display operation, in response to the prop display operation, at least one collected shooting prop and at least one recommended shooting prop may be acquired. At least one first prop control 30 is displayed in the first prop control area on the right side of the main shooting control 20, and at least one second prop control 31 is displayed in the second prop control area on the left side of the main shooting control 20. Alternatively, at least one first shooting control 30 is displayed in the first prop control area on the left side of the main shooting control 20, and at least one second prop control 31 is displayed in the second prop control area on the right side of the main shooting control 20, which is used as an example for the description below.

In addition, with continued reference to FIG. 3, when the first prop controls 30 and the second prop controls 31 are displayed, a close control 32 may also be displayed in the shooting page so that the user may instruct, by triggering the close control 32, the electronic device to switch the shooting page to a state before the first prop controls 30 and the second prop controls 31 are displayed. For example, the first prop controls 30 and the second prop controls 31 displayed in the page are removed and the prop display control 21 and the album control 22 are displayed, as shown in FIG. 2.

In this embodiment, the prop display operation may be an operation of triggering the prop display control in the shooting page or the focus operation. When the prop display operation is the focus operation and the electronic device receives the prop display operation, the electronic device may control, based on the prop display operation, the camera to focus so that it is ensured that a clear image of the scene which the user wants to shoot can be shot. In this case, the prop display operation includes the focus operation, and the method further includes the following step: in response to the prop display operation, the camera currently turned on is controlled to focus on a focus position corresponding to the prop display operation. Here, the focus operation may be any operation of controlling the electronic device to adjust a focal position of the camera, for example, an operation of clicking on the image of any scene displayed in the shooting page. Accordingly, the focus position corresponding to the focus operation may be the focus position of the camera when the clear image of the scene can be shot.

For example, when the prop display operation is the focus operation, in response to the prop display operation, that is, the focus operation, the electronic device may control the camera to focus. For example, the electronic device may determine, according to a shooting parameter (for example, depth of field) of the camera, the distance (that is, an object distance) between the scene corresponding to the image at a position clicked on by the user and the camera, and the electronic device may calculate a focal length of the camera based on the distance and adjust the camera based on the focal length. Alternatively, the electronic device may sequentially adjust a focal length of the camera within the adjustable range of the focal length of the camera until the scene corresponding to the clear (for example, sharpness is greater than a preset sharpness threshold) image at a position clicked on by the user is shot.

In response to a target slide operation, the electronic device may switch a currently displayed shooting page to another shooting page and display the first prop controls and the second prop controls on the two sides of the main shooting control displayed in the shooting page. For a display manner, reference may be made to the preceding description of the display of the first prop controls and second props in the shooting page on which the target slide operation acts.

In S103, when the target slide operation acting on the shooting page is received, multiple shooting controls are controlled to move along a sliding direction of the target slide operation, and when the target slide operation ends, a shooting control located at the trigger position is used as a target shooting control, where the multiple shooting controls include the main shooting control and multiple prop controls, and the multiple prop controls include the first prop control collected in the first prop control area and the second prop control recommended and displayed in the second prop control area.

The target slide operation may be understood as a slide operation whose slide type is a set slide type. The set slide type may be a lateral slide (that is, a leftward or rightward slide in the screen of the electronic device), a longitudinal slide (that is, an upward or downward slide in the screen of the electronic device), an oblique slide, where the included angle between the direction of the oblique slide and the direction of the lateral slide is within a set angle range, or the like. The description is performed below with the example in which the target slide operation is the lateral slide operation.

When the user wants to preview the effect of the shooting prop in the shooting page or wants to replace a prop effect being previewed in the shooting page, the user may perform the lateral slide in the shooting page. Accordingly, when detecting the lateral slide operation of the user, the electronic device determines that the target slide operation acting on the shooting page is received, controls the multiple shooting controls in the lateral queue to synchronously move along the sliding direction of the target slide operation until the target slide operation ends, and determines a control located at the trigger position at the end of the target slide operation as the target shooting control.

In this embodiment, when the target slide operation acts on different areas of the shooting page, the multiple shooting controls in the lateral queue may move synchronously at the same speed or different speeds. For example, when the user performs the lateral slide in any area of the shooting page, the multiple shooting controls may each move at a preset movement speed. Alternatively, when the user performs the lateral slide in an area other than the display position of the lateral queue constituted by the first prop controls, the main shooting control, and the second prop controls in the shooting page (for example, a picture preview area other than the lateral queue), the multiple shooting controls may move at the preset movement speed, and when the user performs the lateral slide in the display position of the lateral queue, the multiple shooting controls may move synchronously with the control point of the lateral slide operation, which is not limited in this embodiment.

In S104, if the target shooting control is a prop control, the preview effect corresponding to the target shooting control is displayed in the shooting page, and when a first trigger operation acting on the trigger position is detected, the shooting is performed by using the target shooting control.

The preview effect corresponding to the target shooting control may be understood as the prop effect of the shooting prop to which the target shooting control belongs. The first trigger operation may be a trigger operation of triggering the trigger position in the shooting page, for example, an operation of clicking on or performing a long press on the trigger position.

When the target shooting control located at the trigger position is the prop control, the preview effect corresponding to the prop control may be displayed in the shooting page. For example, when no preview effect corresponding to any prop control is added to the shooting page, the preview effect corresponding to the target shooting control is directly displayed in the shooting page, and when the preview effect corresponding to another prop control has been displayed in the shooting page, the preview effect displayed in the shooting page is replaced with the preview effect corresponding to the target shooting control, so that it is convenient for the user to determine, according to the preview effect, whether to use the target shooting control for performing the shooting, that is, whether to shoot a content (such as a picture or a video) including the prop effect of the shooting prop corresponding to the target shooting control. Therefore, when the user wants to use the target shooting control for performing the shooting, the user may trigger the trigger position in the shooting page, that is, the target shooting control. Accordingly, when detecting that the user triggers the trigger position in the shooting page, the electronic device may determine that the first trigger operation is received and use the target shooting control for shooting the content including the prop effect corresponding to the target shooting control.

According to the shooting method provided in this embodiment, the prop display operation acting on the shooting page is received, where the trigger position is preset in the shooting page, and the main shooting control is displayed at the trigger position; in response to the prop display operation, the first prop control area and the second prop control area are displayed on the different sides of the main shooting control separately, where the first prop control area is used for displaying the first prop control which is collected and the second prop control area is used for displaying the second prop control which is recommended; when the target slide operation acting on the shooting page is received, the at least one first prop control, the main shooting control, and the at least one second prop control are controlled to move along the sliding direction of the target slide operation, and the shooting control located at the trigger position of the shooting page at the end of the target slide operation is used as the target shooting control; and if the target shooting control is the prop control, the preview effect corresponding to the target shooting control is displayed in the shooting page, and when the first trigger operation acting on the trigger position is detected, the shooting is performed by using the target shooting control. In this embodiment, with the preceding solution, when the prop display operation is received, shooting props are displayed in the manner of the lateral queue. Thus, the occupation of the display positions of other function controls can be avoided so that it is ensured that the implementation of other functions is not affected. Furthermore, the overall effect of the prop can be previewed in real time by the user after the prop is selected so that the efficiency with which the user screens the props is improved. In addition, different types of shooting props are displayed on the two sides of the main shooting control so that the user can view the props in a targeted manner. Thus, it is convenient for the user to screen the props, thereby improving the shooting experience of the user.

Figure 4:
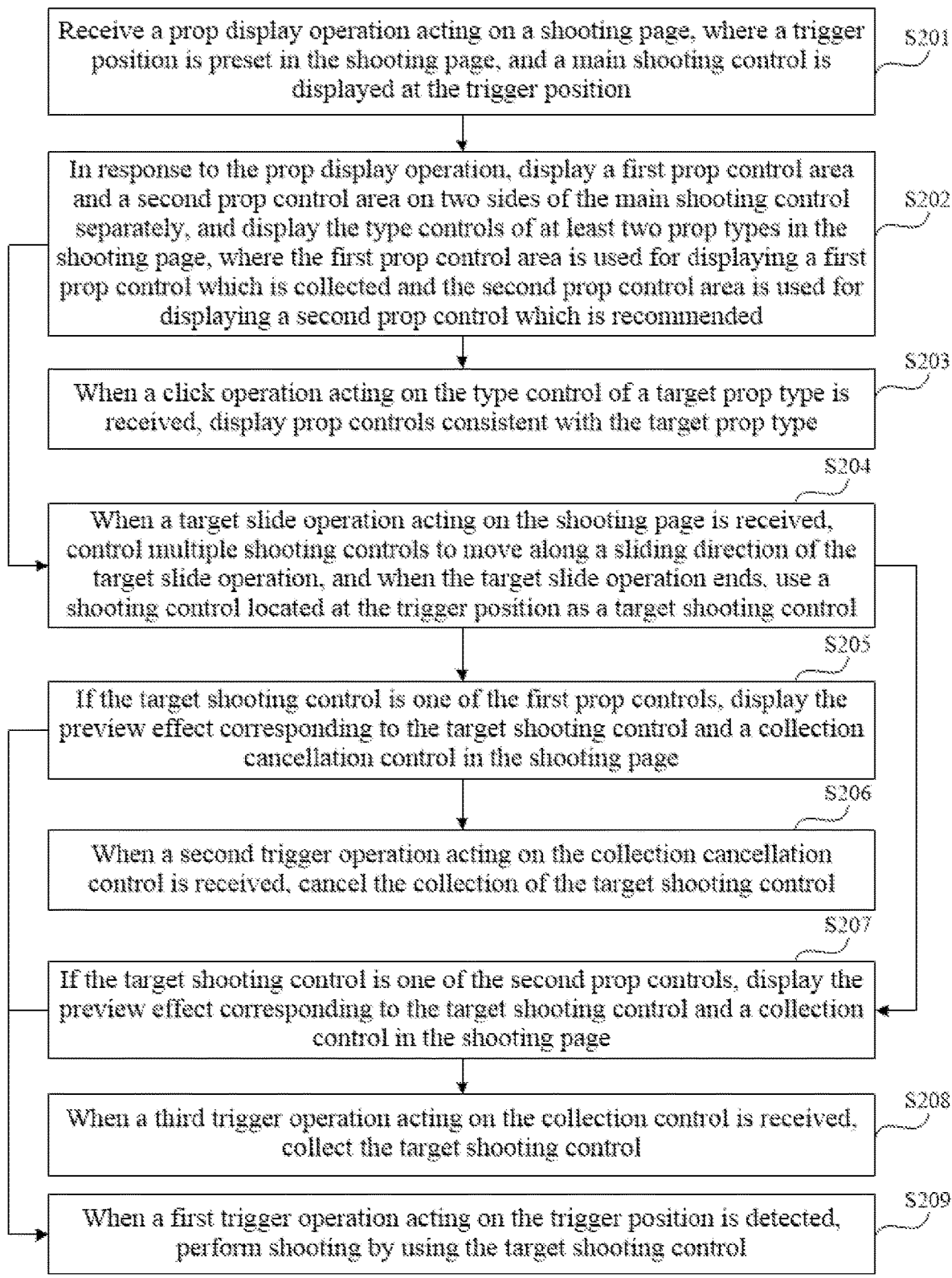
FIG. 4 is a flowchart of another shooting method according to an embodiment of the present disclosure.

FIG. 4 is a flowchart of another shooting method according to an embodiment of the present disclosure. The solution in this embodiment may be combined with one or more optional solutions in the preceding embodiment. Optionally, the shooting method provided in this embodiment further includes the following steps: if the target shooting control is one of the first prop controls, a collection cancellation control is displayed in the shooting page, and when a second trigger operation acting on the collection cancellation control is received, the collection of the target shooting control is cancelled; and if the target shooting control is one of the second prop controls, a collection control is displayed in the shooting page, and when a third trigger operation acting on the collection control is received, the target shooting control is collected.

Optionally, the shooting method provided in this embodiment further includes the following steps: in response to the prop display operation, the type controls of at least two prop types are displayed in the shooting page; and when a click operation acting on the type control of a target prop type is received, prop controls consistent with the target prop type are displayed.

Accordingly, as shown in FIG. 4, the shooting method provided in this embodiment includes the steps described below.

In S201, the prop display operation acting on the shooting page is received, where the trigger position is preset in the shooting page, and the main shooting control is displayed at the trigger position.

In S202, in response to the prop display operation, the first prop control area and the second prop control area are displayed on the two sides of the main shooting control separately, the type controls of the at least two prop types are displayed in the shooting page, and S203 or S204 is performed, where the first prop control area is used for displaying the first prop control which is collected and the second prop control area is used for displaying the second prop control which is recommended.

The prop type of the shooting prop may be preset by a developer. For example, the prop type may include a popular prop, a daily prop, a selfie prop, a scenery prop, a food prop, a pet prop, and/or a game prop.

In this embodiment, with continued reference to FIG. 3, when receiving the prop display operation, the electronic device may display the first prop controls 30 on the left side of the main shooting control 20, display the second prop controls 31 on the right side of the main shooting control 20, and display type controls 33 corresponding to different preset prop types at preset positions (such as positions below a lateral list or positions on the right side of the shooting page) in the shooting page.

In this embodiment, the arrangement manner of the first prop controls and the arrangement manner of the second prop controls in the shooting page may be flexibly set. For example, the at least one first prop control and the at least one second prop control may be arranged at random separately. Alternatively, the at least one first prop control and the at least one second prop control may be arranged separately according to a preset sorting rule. For example, the at least one first prop control may be arranged in the first prop control area on the left side of the main shooting control in the chronological order of collection time. For example, a first prop control whose collection time is earlier is farther away from the main shooting control, and a first prop control whose collection time is later is closer to the main shooting control. In addition, the at least one second prop control may be arranged in the second prop control area on the right side of the main shooting control according to a recommendation degree from high to low. For example, a second prop control whose recommendation degree is higher is closer to the main shooting control, and a second prop control whose recommendation degree is lower is farther away from the main shooting control, so that it is convenient that the user can quickly view the preview effect of a shooting prop recently collected by the user or the preview effect of a shooting prop whose recommendation degree is relatively high and perform the shooting, thereby reducing time consumed for the user to select the shooting prop.

In S203, when the click operation acting on the type control of the target prop type is received, the prop controls consistent with the target prop type are displayed.

The target prop type may be the prop type corresponding to a type control clicked on by the user.

The electronic device displays the type controls corresponding to different prop types in the shooting page. When the user wants to view one type of props, the user may click on the type control of the type of props which the user wants to view, where the type control of the type of props is displayed in the shooting page. Accordingly, when detecting that the user clicks on the type control displayed in the shooting page, the electronic device may acquire the prop controls of the shooting props in the prop type (that is, the target prop type) to which the type control belongs and may display the at least one acquired prop control in the shooting page in the manner of a lateral list (or a longitudinal list).

For example, the at least one prop control consistent with the target prop type is displayed in the manner of the lateral list. The display manner of the at least one prop control in the shooting page may be flexibly set. For example, the prop controls of the shooting props consistent with the target prop type may be displayed on the leftmost side or rightmost side of the lateral list in which the first prop controls and the second prop controls are located. The prop control of the at least one shooting prop consistent with the target prop type may be displayed in the manner of the lateral list above or below the lateral list in which the first prop controls and the second prop controls are located. Alternatively, the first prop controls and/or the second prop controls in the lateral list in which the first prop controls and the second prop controls are located may be switched to the prop control of the at least one shooting prop consistent with the target prop type. The display manner of the at least one prop control in the shooting page is not limited in this embodiment.

In consideration of actual requirements of the user, the first prop controls and/or the second prop controls in the lateral list in which the first prop controls and the second prop controls are located may be directly switched to the prop controls of the shooting props consistent with the target prop type so that the actual requirements of the user are met and the number of lateral lists in the shooting page is reduced. Thus, it is convenient for the user to view the overall effect of the prop. In this case, displaying the prop controls consistent with the target prop type includes the following steps: the at least one prop control of the target prop type is displayed in the first prop control area and/or the second prop control area; or first prop controls consistent with the target prop type are displayed in the first prop control area, and second prop controls consistent with the target prop type are displayed in the second prop control area.

In the preceding embodiment, the electronic device may directly acquire the at least one shooting prop of the target prop type and display the prop control of the at least one acquired shooting prop on one side (such as the first prop control area or the second prop control area) of the main shooting control and may continue displaying or stop displaying the first prop controls or the second prop controls located on the other side of the main shooting control. Alternatively, the electronic device may display the prop control of the at least one acquired shooting prop on the two sides of the main shooting control. Alternatively, according to the target prop type, the collected shooting props corresponding to the at least one first prop control in the lateral list and the recommended shooting props corresponding to the at least one second prop control in the lateral list may be screened, and the first prop controls of collected shooting props obtained by the screening and the second prop controls of recommended shooting props obtained by the screening may be displayed in the lateral list. The setting may be performed according to the requirements.

In S204, when the target slide operation acting on the shooting page is received, the multiple shooting controls are controlled to move along the sliding direction of the target slide operation, when the target slide operation ends, the shooting control located at the trigger position is used as the target shooting control, and S205 or S207 is performed, where the multiple shooting controls include the main shooting control and the multiple prop controls, and the multiple prop controls include the first prop control collected in the first prop control area and the second prop control recommended and displayed in the second prop control area.

In S205, if the target shooting control is one of the first prop controls, the preview effect corresponding to the target shooting control and the collection cancellation control are displayed in the shooting page, and S206 or S209 is performed.

Figure 5:
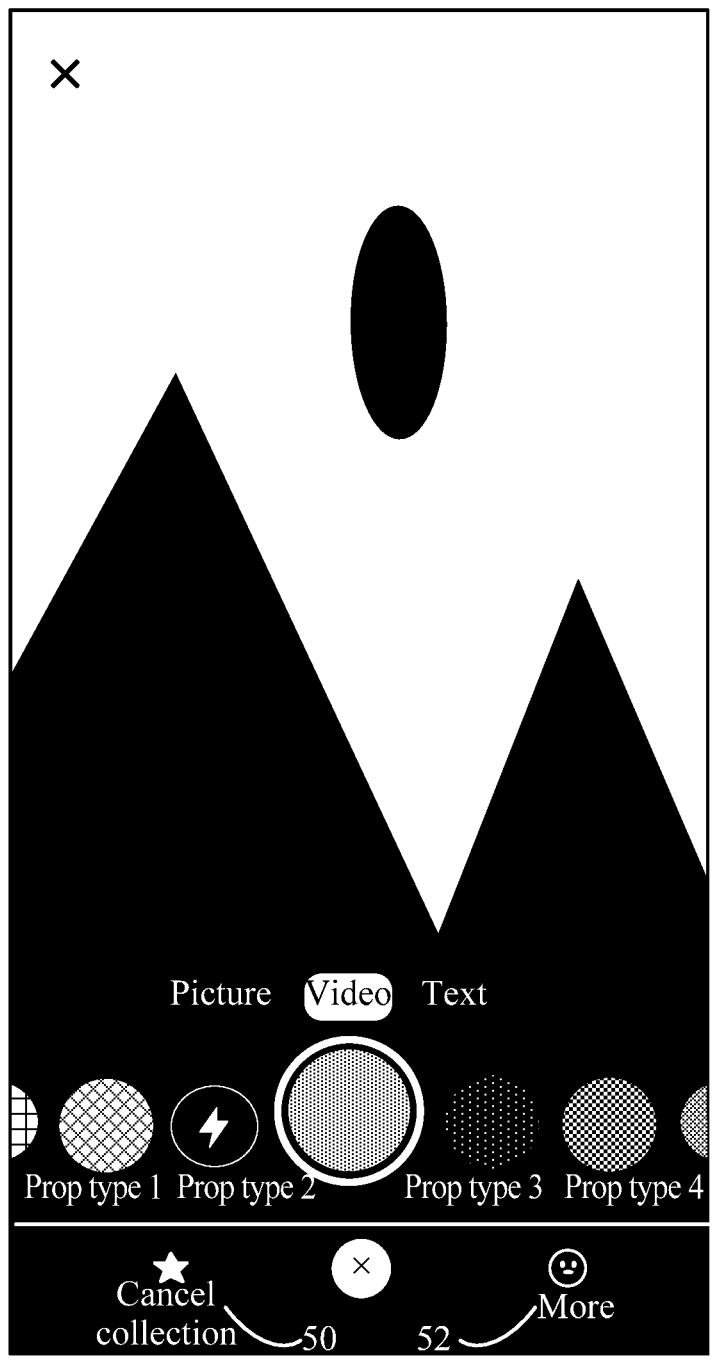
FIG. 5 is a schematic diagram of another shooting page according to an embodiment of the present disclosure.

In this embodiment, when the user moves the prop control of a collected shooting prop to the trigger position, in addition to the preview effect corresponding to the collected shooting prop, a collection cancellation control 50 may also be displayed in the shooting page. For example, as shown in FIG. 5, the collection cancellation control 50 is displayed below the lateral list. Thus, it is convenient for the user to cancel the collection of the shooting prop (that is, the target shooting prop) corresponding to the shooting control located at the trigger position.

In S206, when the second trigger operation acting on the collection cancellation control is received, the collection of the target shooting control is cancelled.

The second trigger operation may be an operation of triggering the collection cancellation control displayed in the shooting page, for example, a click operation acting on the collection cancellation control in the shooting page.

In this embodiment, the user may cancel, by triggering the collection cancellation control displayed in the shooting page, the collection of the target shooting control currently located at the trigger position. For example, when the user wants to cancel the collection of the target shooting control (that is, the first prop control) currently located at the trigger position, the user may trigger the collection cancellation control displayed in the shooting page. Accordingly, when detecting that the user triggers the collection cancellation control in the shooting page, the electronic device determines that the second trigger operation is received and cancels the collection of the target shooting control in response to the second trigger operation. For example, the electronic device directly removes or requests a server to remove the target shooting control from the list of the collected props of the user or directly deletes or requests a server to delete the collection mark of the target shooting control for marking the collection of the target shooting control by the user.

In this embodiment, after the user cancels the collection of the target shooting control, the lateral queue may not be adjusted, that is, the target shooting control is continuously displayed on the left side of the main shooting control in the lateral queue until the prop display operation is received again. Alternatively, after the user cancels the collection of the target shooting control, the lateral queue may be adjusted in real time. For example, the target shooting control is moved from the first prop control area to the second prop control area or the target shooting control is removed from the lateral queue. Thus, it is ensured that the user can clearly perceive that the electronic device has cancelled the collection of the target shooting control, thereby improving user experience. In this case, after the collection of the target shooting control is cancelled, the method further includes the following step: the target shooting control is removed from the first prop control area.

In an example embodiment, the target shooting control may be removed from the lateral queue. In this case, after the target shooting control is removed from the first prop control area, the method may further include the following step: the multiple shooting controls displayed in the shooting page are controlled to move so that a preset shooting control is moved to the trigger position, where the preset shooting control is the main shooting control or a shooting control adjacent to the target shooting control.

For example, after the collection of a target shooting prop is cancelled, the target shooting control displayed in the lateral queue may be deleted, and at least one shooting control located on the left side of the target shooting control in the lateral queue may be controlled to move to the right synchronously, and/or at least one shooting control located on the right side of the target shooting control in the lateral queue may be controlled to move to the left synchronously, so that the preset shooting control (such as a shooting control which is located on the left side of the target shooting control in the lateral list and is adjacent to the target shooting control, or a shooting control or the main shooting control which is located on the right side of the target shooting control in the lateral list and is adjacent to the target shooting control) is moved to the trigger position of the shooting page. In addition, in response to the event that the preset shooting control is moved to the trigger position, when the preset shooting control is the first prop control, the preview effect corresponding to the first shooting control may be displayed in the shooting page, and the collection cancellation control may be continuously displayed; when the preset shooting control is a second prop control, the preview effect corresponding to the second prop control may be displayed in the shooting page and the collection control may be displayed in the shooting page; and when the preset shooting control is the main shooting control, a preview picture to which the preview effect of the shooting prop is not added may be displayed in the shooting page.

In S207, if the target shooting control is one of the second prop controls, the preview effect corresponding to the target shooting control and the collection control are displayed in the shooting page, and S208 or S209 is performed.

Figure 6:
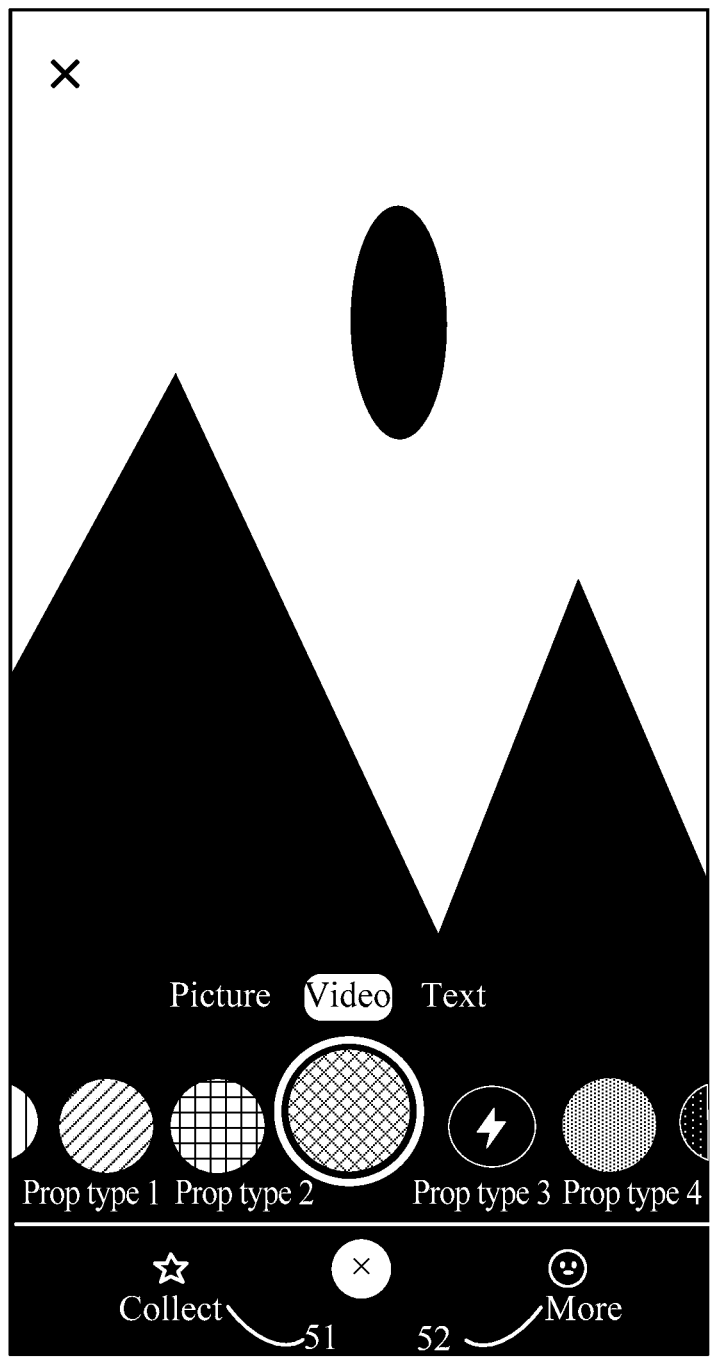
FIG. 6 is a flowchart of another shooting method according to an embodiment of the present disclosure.

In this embodiment, when the user moves a second prop control to the trigger position, in addition to the preview effect corresponding to the second prop control, a collection control 51 may also be displayed in the shooting page. For example, as shown in FIG. 6, the collection control 51 is displayed below the lateral list. Thus, it is convenient for the user to collect the shooting prop (that is, the target shooting prop) corresponding to the shooting control located at the trigger position.

When the user moves the prop control of any shooting prop (not limited to the recommended shooting props) not collected by the user to the trigger position of the shooting page, the electronic device may also display the collection control in the shooting page so that it is convenient for the user to collect the shooting prop corresponding to the prop control located at the trigger position of the shooting page.

In S208, when the third trigger operation acting on the collection control is received, the target shooting control is collected, and the operation is ended.

The third trigger operation may be an operation of triggering the collection control displayed in the shooting page, for example, a click operation acting on the collection control in the shooting page.

In this embodiment, the user may collect, by triggering the collection control displayed in the shooting page, the target shooting control currently located at the trigger position. For example, when the user wants to collect the target shooting control currently located at the trigger position, the user may trigger the collection control displayed in the shooting page. Accordingly, when detecting that the user triggers the collection control in the shooting page, the electronic device determines that the third trigger operation is received and collects the target shooting control in response to the third trigger operation. For example, the electronic device directly adds or requests the server to add the target shooting control to the list of the collected props of the user or adds, for the target shooting prop, the collection mark for marking the collection of the target shooting control by the user.

In this embodiment, after the user collects the target shooting prop, the lateral queue may not be adjusted, that is, the prop control of the target shooting prop is continuously displayed in the second prop control area on the right side of the main shooting control in the lateral queue until the prop display operation is received again. Alternatively, after the user collects the target shooting prop, the lateral queue may be adjusted in real time. For example, the prop control of the target shooting prop in the target lateral queue is moved from the right side of the main shooting control to the left side of the main shooting control. Thus, it is ensured that the user can clearly perceive that the electronic device has collected the target shooting prop, thereby improving the user experience.

When the lateral queue is adjusted in real time after the user collects the target shooting prop, after the target shooting control is collected, the method further includes the following step: shooting controls other than the target shooting control are controlled to move so that the target shooting control is adjusted to the first prop control area.

For example, the description is performed with the example in which the prop control of the target shooting prop is finally displayed at a position which is on the left side of the main shooting control and adjacent to the main shooting control. After the target shooting prop located on the right side of the main shooting control is collected, at least one shooting control located between the main shooting control and the prop control of the target shooting prop (including the main shooting control and not including the prop control of the target shooting prop) in the lateral list may be controlled to synchronously move to the right until the main shooting control is moved to the right side of the prop control of the target shooting prop to be adjacent to the prop control of the target shooting prop. In addition, the at least one first prop control originally located at the left side of the main shooting control in the lateral list is controlled at the same time to synchronously move to the right until the rightmost first prop control located in the at least one first prop control is moved to the left side of the prop control of the target shooting prop to be adjacent to the prop control of the target shooting prop.

Figure 7:
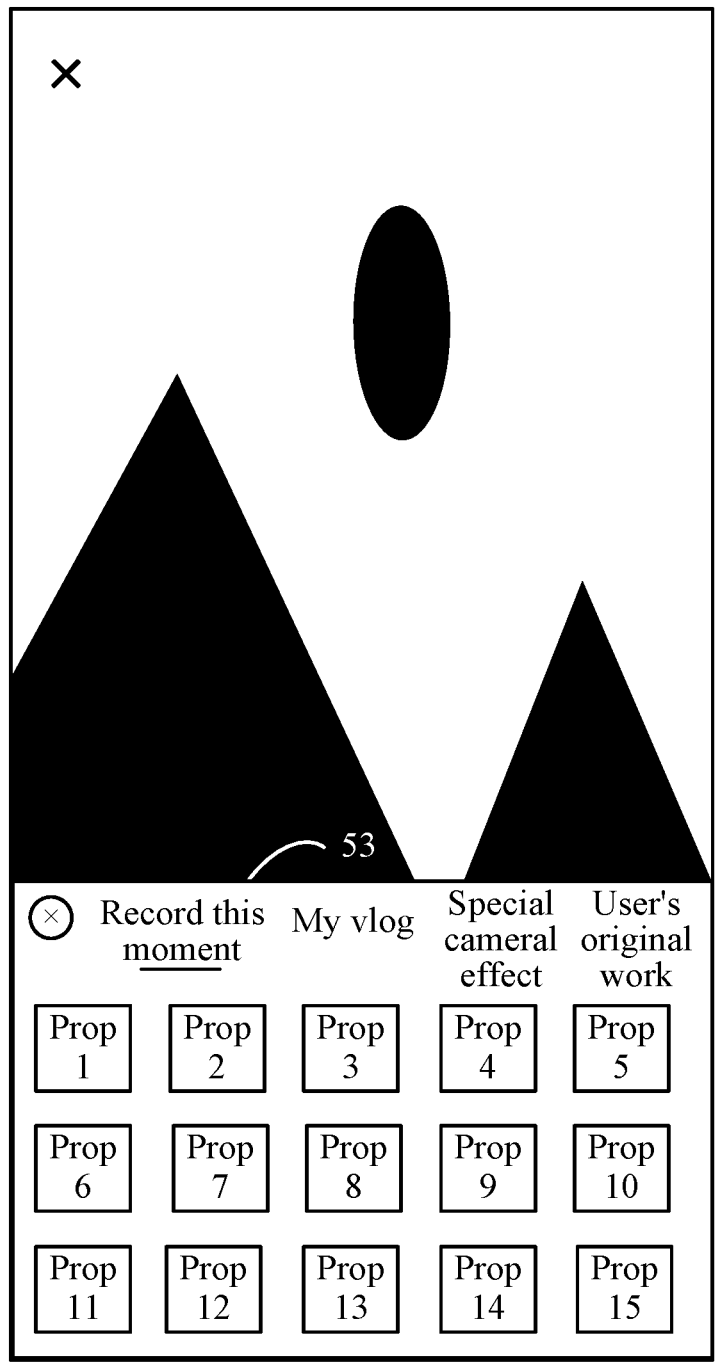
FIG. 7 is a schematic diagram of a prop window according to an embodiment of the present disclosure.

In addition, referring to FIGS. 5 and 6, when the collection control 51/the collection cancellation control 50 is displayed, a "More" control 52 may also be displayed so that the user may instruct, by triggering the "More" control 52, the electronic device to display a prop window 53. That is, when the user wants to view other prop controls or all prop controls, the user may trigger the "More" control 52. Accordingly, when detecting that the user triggers the "More" control 52, the electronic device may display the prop window 53 and show the prop controls of multiple shooting props side by side in the prop window 53, as shown in FIG. 7.

In S209, when the first trigger operation acting on the trigger position is detected, the shooting is performed by using the target shooting control.

According to the shooting method provided in this embodiment, the collection control/the collection cancellation control and the type control of the prop are displayed in the shooting page, and based on the trigger operation of the user on a corresponding control, the prop control located at the trigger position is collected/the collection of the prop control located at the trigger position is cancelled, or the prop control of a corresponding type is displayed. Thus, it is convenient for the user to collect/cancel the collection of the controls and screen the controls, and time consumed for the user to collect/cancel the collection of the shooting props or to view a type of props is reduced, thereby improving the user experience.

Figure 8:
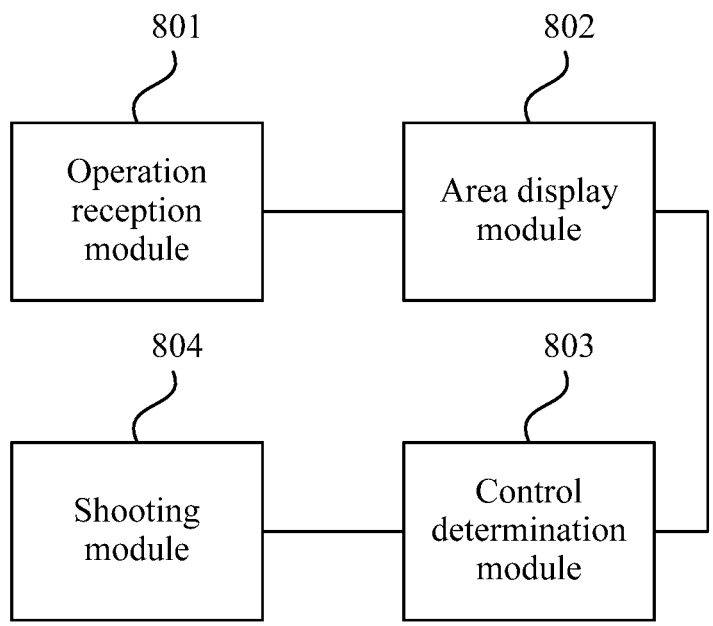
FIG. 8 is a structural block diagram of a shooting apparatus according to an embodiment of the present disclosure.

FIG. 8 is a structural block diagram of a shooting apparatus according to an embodiment of the present disclosure. The apparatus may be implemented by software and/or hardware and may be configured in an electronic device such as a mobile phone or a tablet computer. The apparatus may perform shooting by performing the shooting method. As shown in FIG. 8, the shooting apparatus provided in this embodiment may include an operation reception module 801, an area display module 802, a control determination module 803, and a shooting module 804.

The operation reception module 801 is configured to receive a prop display operation acting on a shooting page, where a trigger position is preset in the shooting page, and a main shooting control is displayed at the trigger position. The area display module 802 is configured to, in response to the prop display operation, display a first prop control area and a second prop control area on two sides of the main shooting control separately, where the first prop control area is used for displaying a first prop control which is collected and the second prop control area is used for displaying a second prop control which is recommended. The control determination module 803 is configured to, when a target slide operation acting on the shooting page is received, control multiple shooting controls to move along a sliding direction of the target slide operation, and when the target slide operation ends, use a shooting control located at the trigger position as a target shooting control, where the multiple shooting controls include the main shooting control and multiple prop controls, and the multiple prop controls include the first prop control collected in the first prop control area and the second prop control recommended and displayed in the second prop control area. The shooting module 804 is configured to, when the target shooting control is a prop control, display the preview effect corresponding to the target shooting control in the shooting page, and when a first trigger operation acting on the trigger position is detected, perform shooting by using the target shooting control.

About the shooting apparatus provided in this embodiment, the prop display operation acting on the shooting page is received by the operation reception module 801, where the trigger position is preset in the shooting page, and the main shooting control is displayed at the trigger position. In response to the prop display operation, the first prop control area and the second prop control area are displayed by the area display module 802 on different sides of the main shooting control separately, where the first prop control area is used for displaying the first prop control which is collected and the second prop control area is used for displaying the second prop control which is recommended. When the target slide operation acting on the shooting page is received, at least one first prop control, the main shooting control, and at least one second prop control are controlled by the control determination module 803 to move along the sliding direction of the target slide operation, and when the target slide operation ends, the shooting control located at the trigger position of the shooting page is used by the control determination module 803 as the target shooting control. When the target shooting control is the prop control, the preview effect corresponding to the target shooting control is displayed by the shooting module 804 in the shooting page, and when the trigger operation acting on the trigger position is detected, the shooting is performed by the shooting module 804 by using the target shooting control. In this embodiment, with the preceding solution, when the prop display operation is received, shooting props are displayed in the manner of a lateral queue. Thus, the occupation of the display positions of other function controls can be avoided so that it is ensured that the implementation of other functions is not affected.

Furthermore, the overall effect of a prop can be previewed in real time by the user after the prop is selected so that the efficiency with which the user screens the props is improved. In addition, different types of shooting props are displayed on the two sides of the main shooting control so that the user can view the props in a targeted manner. Thus, it is convenient for the user to screen the props, thereby improving the shooting experience of the user.

In the preceding solution, the prop display operation may include a focus operation, and the shooting apparatus provided in this embodiment may further include a focus module configured to control, in response to the prop display operation, a camera currently turned on to focus on a focus position corresponding to the prop display operation.

In the preceding solution, a first prop may be a collected shooting prop, and a second prop may be a recommended shooting prop. The shooting apparatus provided in this embodiment may further include: a collection cancellation module configured to display a collection cancellation control in the shooting page when the target shooting control is one of the first prop controls and cancel the collection of the target shooting control when a second trigger operation acting on the collection cancellation control is received; and a collection module configured to display a collection control in the shooting page when the target shooting control is one of the second prop controls and collect the target shooting control when a third trigger operation acting on the collection control is received.

The shooting apparatus provided in this embodiment may further include a control removal module configured to remove the target shooting control from the first prop control area after the collection of the target shooting control is cancelled.

The shooting apparatus provided in this embodiment may further include a first movement module configured to, after the target shooting control is removed from the first prop control area, control the multiple shooting controls displayed in the shooting page to move so as to move a preset shooting control to the trigger position, where the preset shooting control is the main shooting control or a shooting control adjacent to the target shooting control.

The shooting apparatus provided in this embodiment may further include a second movement module configured to, after the target shooting control is collected, control shooting controls other than the target shooting control to move to adjust the target shooting control to the first prop control area.

The shooting apparatus provided in this embodiment may further include a control display module configured to display the type controls of at least two prop types in the shooting page in response to the prop display operation; a third control display module configured to display prop controls consistent with a target prop type when a click operation acting on the type control of the target prop type is received.

In the preceding solution, the third control display module may be configured to: when the click operation acting on the type control of the target prop type is received, display the prop control of at least one shooting prop of the target prop type on a side of the main shooting control; or display the first prop controls of collected shooting props consistent with the target prop type on one side of the main shooting control, and display the second prop controls of recommended shooting props consistent with the target prop type on the other side of the main shooting control.

The shooting apparatus provided in the embodiment of the present disclosure may perform the shooting method provided in any embodiment of the present disclosure and has function modules and effects corresponding to the shooting method performed. For technical details not described in detail in this embodiment, reference may be made to the shooting method provided in any embodiment of the present disclosure.

Figure 9:
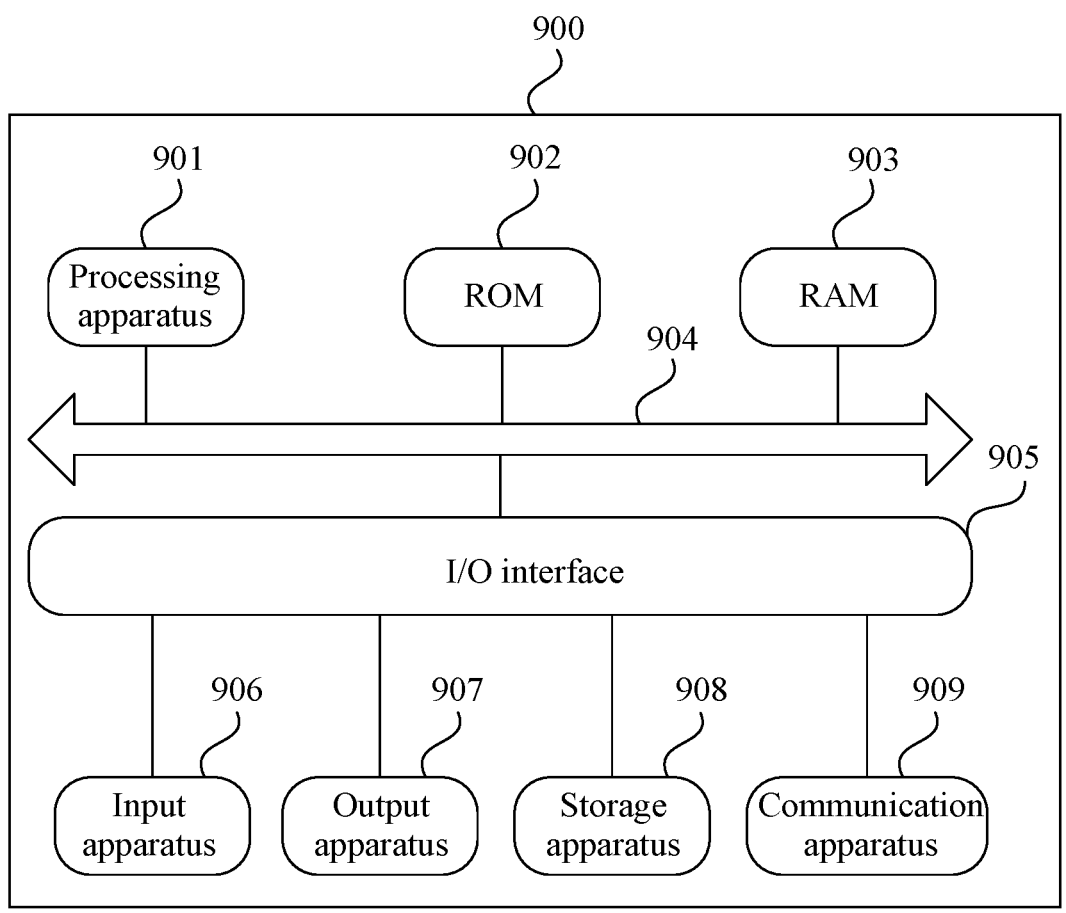
FIG. 9 is a structural diagram of an electronic device according to an embodiment of the present disclosure.

Referring to FIG. 9, FIG. 9 illustrates a structural diagram of an electronic device (for example, a terminal device) 900 suitable for implementing the embodiments of the present disclosure. The terminal device in the embodiments of the present disclosure may include, but is not limited to, a mobile terminal such as a mobile phone, a laptop, a digital broadcast receiver, a personal digital assistant (PDA), a portable Android device (PAD), a portable media player (PMP), and an in-vehicle terminal (such as an in-vehicle navigation terminal), and a stationary terminal such as a digital television (TV) and a desktop computer. The electronic device shown in FIG. 9 is only an example and should not impose any limitation on the function and scope of use of the embodiments of the present disclosure.

As shown in FIG. 9, the electronic device 900 may include a processing apparatus (such as a central processing unit or a graphics processing unit) 901. The processing apparatus 901 may perform various appropriate actions and processing according to a program stored in a read-only memory (ROM) 902 or a program loaded from a storage apparatus 908 into a random-access memory (RAM) 903. Various programs and data necessary for the operation of the electronic device 900 are also stored in the RAM 903. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906 such as a touch screen, a touchpad, a keyboard, a mouse, a camera, a microphone, an accelerometer, and a gyroscope; an output apparatus 907 such as a liquid crystal display (LCD), a speaker, and a vibrator; the storage apparatus 908 such as a magnetic tape and a hard disk; and a communication apparatus 909. The communication apparatus 909 may allow the electronic device 900 to communicate wirelessly or by wire with another device to exchange data. Although FIG. 9 illustrates the electronic device 900 having various apparatuses, not all of the illustrated apparatuses are implemented or available. Alternatively, more or fewer apparatuses may be implemented or available.

According to the embodiments of the present disclosure, the processes described above with reference to the flowcharts may be implemented as computer software programs. For example, a computer program product is provided in the embodiments of the present disclosure. The computer program product includes a computer program carried on a non-transitory computer-readable medium. The computer program includes program codes for performing the methods illustrated in the flowcharts. In such an embodiment, the computer program may be downloaded and installed from the network via the communication apparatus 909, or may be installed from the storage apparatus 908, or may be installed from the ROM 902. When the computer program is executed by the processing apparatus 901, the preceding functions defined in the methods according to the embodiments of the present disclosure are performed.

The preceding computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a RAM, a ROM, an erasable programmable read-only memory (EPROM or a flash memory), an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or in conjunction with an instruction execution system, apparatus, or device. In the present disclosure, however, the computer-readable signal medium may include a data signal propagated in baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes embodied on the computer-readable medium may be transmitted via any appropriate medium including, but not limited to, an electrical wire, an optical cable, a radio frequency (RF), or any appropriate combination thereof.

In some implementations, clients and servers may communicate using any currently known or future developed network protocol such as the HyperText Transfer Protocol (HTTP) and may be interconnected with any form or medium of digital data communication (such as a communication network). Examples of the communication network include a local area network (LAN), a wide area network (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The preceding computer-readable medium carries one or more programs. When the one or more programs are executed by the electronic device, the electronic device is configured to: receive a prop display operation acting on a shooting page, where a trigger position is preset in the shooting page, and a main shooting control is displayed at the trigger position; in response to the prop display operation, display a first prop control area and a second prop control area on two sides of the main shooting control separately, where the first prop control area is used for displaying a first prop control which is collected and the second prop control area is used for displaying a second prop control which is recommended; when a target slide operation acting on the shooting page is received, control multiple shooting controls to move along a sliding direction of the target slide operation, and when the target slide operation ends, use a shooting control located at the trigger position as a target shooting control, where the multiple shooting controls include the main shooting control and multiple prop controls, and the multiple prop controls include the first prop control collected in the first prop control area and the second prop control recommended and displayed in the second prop control area; and if the target shooting control is a prop control, display the preview effect corresponding to the target shooting control in the shooting page, and when a first trigger operation acting on the trigger position is detected, perform shooting by using the target shooting control.

Computer program codes for performing the operations in the present disclosure may be written in one or more programming languages or a combination thereof. The preceding programming languages include, but are not limited to, object-oriented programming languages such as Java, Smalltalk, C++, and conventional procedural programming languages such as the "C" language or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any kind of network including a LAN or a WAN. Alternatively, the remote computer may be connected to an external computer (for example, over the Internet provided by an Internet service provider).

The flowcharts and block diagrams in the drawings illustrate possible architectures, functions and operations of the system, method and computer program product according to the embodiments of the present disclosure. In this regard, each block in the flowcharts or block diagrams may represent a module, a program segment, or part of codes. The module, program segment, or part of codes contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a module does not limit the unit in a case.

The functions described herein above may be performed, at least partially, by one or more hardware logic components. For example, without limitation, example types of hardware logic components that may be used include: a field programmable gate array (FPGA), an application specific integrated circuit (ASIC), an application specific standard product (ASSP), a system on chip (SOC), a complex programmable logic device (CPLD), and the like.

In the context of the present disclosure, the machine-readable medium may be a tangible medium that may include or store a program used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Examples of the machine-readable storage medium may include an electrical connection with one or more wires, a portable computer disk, a hard disk, a RAM, a ROM, an EPROM, a flash memory, an optical fiber, a CD-ROM, an optical storage device, a magnetic storage device, or any appropriate combination thereof.

According to one or more embodiments of the present disclosure, example 1 provides a shooting method. The method includes the steps described below.

A prop display operation acting on a shooting page is received, where a trigger position is preset in the shooting page, and a main shooting control is displayed at the trigger position.

In response to the prop display operation, a first prop control area and a second prop control area are displayed on two sides of the main shooting control separately, where the first prop control area is used for displaying a first prop control which is collected and the second prop control area is used for displaying a second prop control which is recommended.

When a target slide operation acting on the shooting page is received, multiple shooting controls are controlled to move along a sliding direction of the target slide operation, and when the target slide operation ends, a shooting control located at the trigger position is used as a target shooting control, where the multiple shooting controls include the main shooting control and multiple prop controls, and the multiple prop controls include the first prop control collected in the first prop control area and the second prop control recommended and displayed in the second prop control area.

If the target shooting control is a prop control, the preview effect corresponding to the target shooting control is displayed in the shooting page, and when a first trigger operation acting on the trigger position is detected, shooting is performed by using the target shooting control.

According to one or more embodiments of the present disclosure, in example 2, according to the method described in example 1, the prop display operation includes a focus operation, and the method further includes the step described below.

In response to the prop display operation, a camera currently turned on is controlled to focus on a focus position corresponding to the prop display operation.

According to one or more embodiments of the present disclosure, in example 3, according to the method described in example 1, collected shooting props are the collected shooting props, recommended shooting props are the recommended shooting props, and the method further includes the steps described below.

If the target shooting control is one of the first prop controls, a collection cancellation control is displayed in the shooting page, and when a second trigger operation acting on the collection cancellation control is received, the collection of the target shooting control is cancelled.

If the target shooting control is one of the second prop controls, a collection control is displayed in the shooting page, and when a third trigger operation acting on the collection control is received, the target shooting control is collected.

According to one or more embodiments of the present disclosure, in example 4, according to the method described in example 3, after the collection of the target shooting control is cancelled, the method further includes the step described below.

The target shooting control is removed from the first prop control area.

According to one or more embodiments of the present disclosure, in example 5, according to the method described in example 4, after the target shooting control is removed from the first prop control area, the method further includes the step described below.

The multiple shooting controls displayed in the shooting page are controlled to move so that a preset shooting control is moved to the trigger position, where the preset shooting control is the main shooting control or a shooting control adjacent to the target shooting control.

According to one or more embodiments of the present disclosure, in example 6, according to the method described in example 3, after the target shooting control is collected, the method further includes the step described below.

Shooting controls other than the target shooting control are controlled to move so that the target shooting control is adjusted to the first prop control area.

According to one or more embodiments of the present disclosure, in example 7, according to the method described in any one of examples 1 to 6, the method further includes the steps described below.

In response to the prop display operation, the type controls of at least two prop types are displayed in the shooting page.

When a click operation acting on the type control of a target prop type is received, prop controls consistent with the target prop type are displayed.

According to one or more embodiments of the present disclosure, in example 8, according to the method described in example 7, displaying the prop controls consistent with the target prop type includes the steps described below.

At least one prop control of the target prop type is displayed in the first prop control area and/or the second prop control area.

Alternatively, first prop controls consistent with the target prop type are displayed in the first prop control area, and second prop controls consistent with the target prop type are displayed in the second prop control area.

According to one or more embodiments of the present disclosure, example 9 provides a shooting apparatus. The shooting apparatus includes an operation reception module, an area display module, a control determination module, and a shooting module.

The operation reception module is configured to receive a prop display operation acting on a shooting page, where a trigger position is preset in the shooting page, and a main shooting control is displayed at the trigger position.

The area display module is configured to, in response to the prop display operation, display a first prop control area and a second prop control area on two sides of the main shooting control separately, where the first prop control area is used for displaying a first prop control which is collected and the second prop control area is used for displaying a second prop control which is recommended.

The control determination module is configured to, when a target slide operation acting on the shooting page is received, control multiple shooting controls to move along a sliding direction of the target slide operation, and when the target slide operation ends, use a shooting control located at the trigger position as a target shooting control, where the multiple shooting controls include the main shooting control and multiple prop controls, and the multiple prop controls include the first prop control collected in the first prop control area and the second prop control recommended and displayed in the second prop control area.

The shooting module is configured to, when the target shooting control is a prop control, display the preview effect corresponding to the target shooting control in the shooting page, and when a first trigger operation acting on the trigger position is detected, perform shooting by using the target shooting control.

According to one or more embodiments of the present disclosure, example 10 provides an electronic device.

The electronic device includes one or more processors and a memory.

The memory is configured to store one or more programs.

When the one or more programs are executed by the one or more processors, the one or more processors perform the shooting method according to any one of examples 1 to 8.

According to one or more embodiments of the present disclosure, example 11 provides a computer-readable storage medium. The storage medium stores a computer program which, when executed by a processor, causes the processor to perform the shooting method according to any one of examples 1 to 8.

In addition, although operations are illustrated in a particular order, it should not be construed as that the operations are required to be performed in the particular order shown or in a sequential order. Under certain circumstances, multitasking and parallel processing may be advantageous. Similarly, although multiple implementation details are included in the preceding discussion, these should not be construed as limitations on the scope of the present disclosure. Some features described in the context of separate embodiments may also be implemented in combination in a single embodiment. Rather, features described in the context of a single embodiment may be implemented in multiple embodiments separately or in any appropriate sub-combination.

What is claimed is:

1. A shooting method, comprising:
receiving a prop display operation acting on a shooting page, wherein the prop display operation comprises a focus operation, wherein a trigger position is preset in the shooting page, and wherein a main shooting control is displayed at the trigger position;
in response to the prop display operation, controlling a camera currently turned on to focus on a focus position corresponding to the prop display operation;
in response to the prop display operation, displaying a first prop control area and a second prop control area on two sides of the main shooting control separately, wherein the first prop control area is used for displaying a first prop control which is collected and the second prop control area is used for displaying a second prop control which is recommended;
in response to reception of a target slide operation acting on the shooting page, controlling a plurality of shooting controls to move along a sliding direction of the target slide operation, and in response to an end of the target slide operation, using a shooting control located at the trigger position as a target shooting control, wherein the plurality of shooting controls comprise the main shooting control and a plurality of prop controls, and the plurality of prop controls comprise the first prop control collected in the first prop control area and the second prop control recommended and displayed in the second prop control area; and
in a case where the target shooting control is a prop control among the plurality of prop controls, displaying a preview effect corresponding to the target shooting control in the shooting page, and in response to detection of a first trigger operation acting on the trigger position, performing shooting by using the target shooting control.

2. The method according to claim 1, further comprising:
in a case where the target shooting control is the first prop control, displaying a collection cancellation control in the shooting page, and in response to reception of a second trigger operation acting on the collection cancellation control, cancelling collection of the target shooting control; and
in a case where the target shooting control is the second prop control, displaying a collection control in the shooting page, and in response to reception of a third trigger operation acting on the collection control, collecting the target shooting control.

3. The method according to claim 2, wherein after cancelling the collection of the target shooting control, the method further comprises:
removing the target shooting control from the first prop control area.

4. The method according to claim 3, wherein after removing the target shooting control from the first prop control area, the method further comprises:
controlling the plurality of shooting controls displayed in the shooting page to move so as to move a preset shooting control to the trigger position, wherein the preset shooting control is the main shooting control or a shooting control adjacent to the target shooting control.

5. The method according to claim 2, wherein after collecting the target shooting control, the method further comprises:
controlling a shooting control other than the target shooting control to move so as to adjust the target shooting control to the first prop control area.

6. The method according to claim 1, further comprising:
in response to the prop display operation, displaying type controls of at least two prop types in the shooting page; and
in response to reception of a click operation acting on a type control of a target prop type, displaying a prop control consistent with the target prop type.

7. The method according to claim 6, wherein displaying the prop control consistent with the target prop type comprises:
displaying at least one prop control of the target prop type in at least one of the first prop control area or the second prop control area; or
displaying a first prop control consistent with the target prop type in the first prop control area, and displaying a second prop control consistent with the target prop type in the second prop control area.

8. An electronic device, comprising:
at least one processor; and
a memory configured to store at least one program;
wherein when the at least one program is executed by the at least one processor, the at least one processor performs steps, wherein the steps comprise:
receiving a prop display operation acting on a shooting page, wherein the prop display operation comprises a focus operation, wherein a trigger position is preset in the shooting page, and wherein a main shooting control is displayed at the trigger position;
in response to the prop display operation, controlling a camera currently turned on to focus on a focus position corresponding to the prop display operation;
in response to the prop display operation, displaying a first prop control area and a second prop control area on two sides of the main shooting control separately, wherein the first prop control area is used for displaying a first prop control which is collected and the second prop control area is used for displaying a second prop control which is recommended;

in response to reception of a target slide operation acting on the shooting page, controlling a plurality of shooting controls to move along a sliding direction of the target slide operation, and in response to an end of the target slide operation, using a shooting control located at the trigger position as a target shooting control, wherein the plurality of shooting controls comprise the main shooting control and a plurality of prop controls, and the plurality of prop controls comprise the first prop control collected in the first prop control area and the second prop control recommended and displayed in the second prop control area; and in a case where the target shooting control is a prop control among the plurality of prop controls, displaying a preview effect corresponding to the target shooting control in the shooting page, and in response to detection of a first trigger operation acting on the trigger position, performing shooting by using the target shooting control.

9. The electronic device according to claim 8, wherein the steps further comprise:

in a case where the target shooting control is the first prop control, displaying a collection cancellation control in the shooting page, and in response to reception of a second trigger operation acting on the collection cancellation control, cancelling collection of the target shooting control; and in a case where the target shooting control is the second prop control, displaying a collection control in the shooting page, and in response to reception of a third trigger operation acting on the collection control, collecting the target shooting control.

10. The electronic device according to claim 9, wherein after cancelling the collection of the target shooting control, the steps further comprise:

removing the target shooting control from the first prop control area.

11. The electronic device according to claim 10, wherein after removing the target shooting control from the first prop control area, the steps further comprise:

controlling the plurality of shooting controls displayed in the shooting page to move so as to move a preset shooting control to the trigger position, wherein the preset shooting control is the main shooting control or a shooting control adjacent to the target shooting control.

12. The electronic device according to claim 9, wherein after collecting the target shooting control, the steps further comprise:

controlling a shooting control other than the target shooting control to move so as to adjust the target shooting control to the first prop control area.

13. The electronic device according to claim 8, further comprising:

in response to the prop display operation, displaying type controls of at least two prop types in the shooting page; and in response to reception of a click operation acting on a type control of a target prop type, displaying a prop control consistent with the target prop type.

14. The electronic device according to claim 13, wherein displaying the prop control consistent with the target prop type comprises:

displaying at least one prop control of the target prop type in at least one of the first prop control area or the second prop control area; or displaying a first prop control consistent with the target prop type in the first prop control area, and displaying a second prop control consistent with the target prop type in the second prop control area.

15. A non-transitory computer-readable storage medium storing a computer program which, when executed by a processor, causes the processor to perform steps, wherein the steps comprise:

receiving a prop display operation acting on a shooting page, wherein the prop display operation comprises a focus operation, wherein a trigger position is preset in the shooting page, and wherein a main shooting control is displayed at the trigger position;

in response to the prop display operation, controlling a camera currently turned on to focus on a focus position corresponding to the prop display operation;

in response to the prop display operation, displaying a first prop control area and a second prop control area on two sides of the main shooting control separately, wherein the first prop control area is used for displaying a first prop control which is collected and the second prop control area is used for displaying a second prop control which is recommended;

in response to reception of a target slide operation acting on the shooting page, controlling a plurality of shooting controls to move along a sliding direction of the target slide operation, and in response to an end of the target slide operation, using a shooting control located at the trigger position as a target shooting control, wherein the plurality of shooting controls comprise the main shooting control and a plurality of prop controls, and the plurality of prop controls comprise the first prop control collected in the first prop control area and the second prop control recommended and displayed in the second prop control area; and in a case where the target shooting control is a prop control among the plurality of prop controls, displaying a preview effect corresponding to the target shooting control in the shooting page, and in response to detection of a first trigger operation acting on the trigger position, performing shooting by using the target shooting control.

16. The storage medium according to claim 15, wherein the steps further comprise:

in a case where the target shooting control is the first prop control, displaying a collection cancellation control in the shooting page, and in response to reception of a second trigger operation acting on the collection cancellation control, cancelling collection of the target shooting control; and in a case where the target shooting control is the second prop control, displaying a collection control in the shooting page, and in response to reception of a third trigger operation acting on the collection control, collecting the target shooting control.

17. The storage medium according to claim 16, wherein after cancelling the collection of the target shooting control, the steps further comprise:

removing the target shooting control from the first prop control area.

* * * * *